(12) United States Patent
Tan et al.

(10) Patent No.: US 10,282,210 B2
(45) Date of Patent: May 7, 2019

(54) SYSTEM AND METHOD FOR VIRTUAL HARDWARE CONTROL

(71) Applicant: Huawei Technologies Co., Ltd., Shenzhen (CN)

(72) Inventors: Yin Tan, Waterloo (CA); Dong Jin Kim, Gyeonggi (KR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/180,568

(22) Filed: Jun. 13, 2016

(65) Prior Publication Data
US 2017/0357516 A1   Dec. 14, 2017

(51) Int. Cl.
*G06F 9/44* (2018.01)
*G06F 9/4401* (2018.01)
*G06F 9/54* (2006.01)
*G06F 9/455* (2018.01)

(52) U.S. Cl.
CPC ............ *G06F 9/4411* (2013.01); *G06F 9/545* (2013.01); *G06F 9/455* (2013.01)

(58) Field of Classification Search
CPC .................................................. G06F 9/4411
See application file for complete search history.

(56) References Cited

U.S. PATENT DOCUMENTS

| | | | | |
|---|---|---|---|---|
| 8,028,040 B1* | 9/2011 | Hobbs | ................. | G06F 9/45558 370/389 |
| 8,561,065 B2 | 10/2013 | Cunningham et al. | | |
| 9,380,456 B1* | 6/2016 | Lee | ........................ | H04W 12/08 |
| 2006/0206904 A1* | 9/2006 | Watkins | .............. | G06F 9/45537 719/321 |
| 2007/0067769 A1 | 3/2007 | Geisinger | | |
| 2008/0320501 A1* | 12/2008 | Li | ........................ | G06F 9/45537 719/324 |
| 2011/0126268 A1* | 5/2011 | Youngworth | ......... | G06F 12/109 726/4 |
| 2011/0126269 A1* | 5/2011 | Youngworth | ......... | G06F 12/109 726/4 |
| 2012/0033673 A1 | 2/2012 | Goel | | |

(Continued)

FOREIGN PATENT DOCUMENTS

| CN | 103155520 A | 6/2013 |
|---|---|---|
| CN | 104598309 A | 5/2015 |

OTHER PUBLICATIONS

Microsoft "Programming the microsoft Windows Driver Model" 2000, 3 pages.*

*Primary Examiner* — Brian W Wathen
*Assistant Examiner* — Abdou K Seye
(74) *Attorney, Agent, or Firm* — Slater Matsil, LLP (57) ABSTRACT

A system and method for virtual hardware control includes accessing, by a controller, a first driver message from at least one hardware device driver for at least one hardware resource on a user device, the at least one hardware device driver located in a kernel space on an operating system of the user device, sending, by the controller, the first driver message to a first virtual device driver, the first virtual device driver located in the kernel space, and forwarding, by the first virtual device driver, the first driver message to a first virtual container, the first virtual container being a first user space that is outside the kernel space of the operating system.

22 Claims, 7 Drawing Sheets

(56) References Cited

U.S. PATENT DOCUMENTS

| | | | |
|---|---|---|---|
| 2013/0219090 A1* | 8/2013 | Lee .................. | G06F 9/445 710/62 |
| 2014/0108794 A1* | 4/2014 | Barton ............... | G06F 21/6218 713/165 |
| 2014/0359706 A1* | 12/2014 | Diaz-Cuellar ......... | G06F 21/12 726/4 |

* cited by examiner

SYSTEM AND METHOD FOR VIRTUAL HARDWARE CONTROL

TECHNICAL FIELD

The present invention relates generally to operating systems, and, in particular embodiments, to a system and method for virtual hardware control.

BACKGROUND

Generally, virtual systems have several user space instances virtualized at the operating system level. Many devices today, such as smartphones, tablets, and cloud computing systems, are virtualized to include several user space instances, which allows for greater granularity and control over the software on a device. Although a typical operating system includes one kernel space and one user space instance, a virtualized system may include one kernel space and several user space instances (sometimes called "virtual containers" or simply "containers"). A virtualized system allows each virtual container to be isolated; however, each virtual container may still need to access hardware resources on the device that runs the operating system.

SUMMARY

In accordance with an embodiment of the present invention, a method includes accessing, by a controller, a first driver message from at least one hardware device driver for at least one hardware resource on a user device, the at least one hardware device driver located in a kernel space on an operating system of the user device, sending, by the controller, the first driver message to a first virtual device driver, the first virtual device driver located in the kernel space, and forwarding, by the first virtual device driver, the first driver message to a first virtual container, the first virtual container being a first user space that is outside the kernel space of the operating system.

In accordance with an embodiment of the present invention, a method includes receiving, by a resource manager, a request to prevent a first virtual container from accessing a hardware resource, the first virtual container being a first user space on an operating system, accessing, by a controller, driver messages from a hardware device driver for the hardware resource, the hardware device driver located in a kernel space on the operating system, the first user space outside the kernel space, preventing, by the resource manager, transmission of at least one of the driver messages to the first virtual container, and sending, by the controller, the at least one driver messages to a second virtual container that is different than the first virtual container, the second virtual container being a second user space on the operating system outside the kernel space.

In accordance with an embodiment of the present invention, an operating system includes a kernel space comprising at least one hardware device driver for accessing and configuring hardware resources, and a virtual device driver for accessing and configuring a subset of functionality of the at least one hardware device driver, a first user space comprising a process configured to access the virtual device driver, and a second user space comprising a controller configured to forward driver messages between the virtual device driver and the at least one hardware device driver.

Various embodiments may achieve advantages. Operating system platform support may be increased through more generic hardware device virtualization. Use of virtual device drivers may allow a hardware resource that would typically be accessed by only one virtual container, such as an audio device, to be shared with multiple virtual containers. Aspects of the present invention may satisfy Mobile Device Management (MDM) requirements in various enterprise network scenarios. Restricting applications or services in a virtual container to the use of virtual device drivers may reduce the attack surface of the operating system by protecting hardware device drivers in kernel space. The attack surface may also be reduced by controlling the virtual device drivers and filtering device access operations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
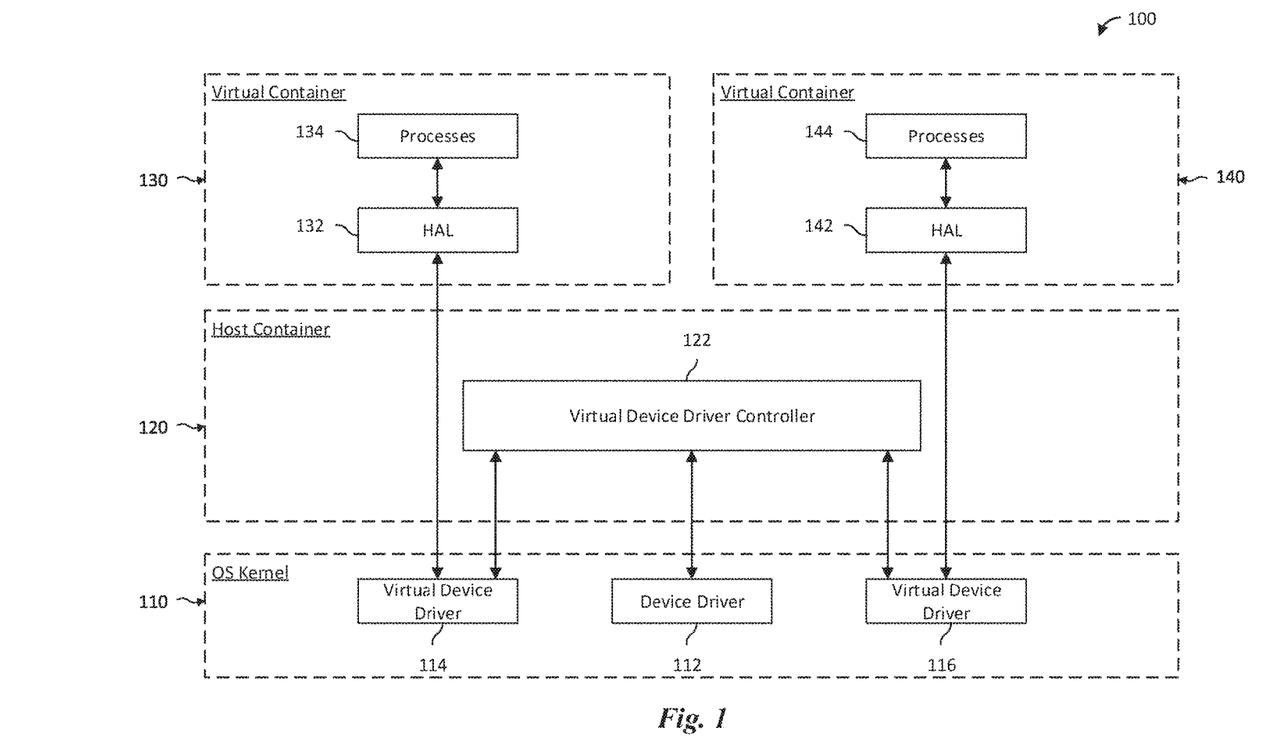
FIG. 1 is a block diagram of an operating system with virtual hardware.

FIG. 1 is a block diagram of an operating system 100 with virtual hardware. The operating system 100 includes a kernel 110, a host container 120, and virtual containers 130, 140. The operating system 100 runs on a user device (not shown). The operating system 100 uses operating-system-level virtualization, such that the operating system 100 includes one kernel 110 and multiple virtual containers 130, 140. The operating system 100 may be an ecosystem on the user device, such as Android, Windows, or iOS. The user device includes hardware resources or features (not shown) that are shared by the virtual containers 130, 140. The shared hardware resources may include, e.g., audio, video, global positioning system (GPS), keyboard, mouse, or touchscreen devices.

In some embodiments, the user device is a device associated with an enterprise network that has a bring your own device (BYOD) or corporate-owned, personally enabled (COPE) device policy. In COPE and BYOD scenarios, a mechanism is needed to manage and control each virtual container's access to the hardware resources. For example, this mechanism may be Mobile Device Management (MDM). In such embodiments, the virtual containers 130, 140 are used to satisfy these policy requirements. For example, in some embodiments, the virtual container 130 is configured with an enterprise security policy, and the virtual container 140 is configured without the enterprise security policy; the user device then selects one of the virtual containers 130, 140 to use based on a variety of criteria. For example, the virtual container 130 may be used when the user device is on a work site or during working hours, and the virtual container 140 may be used when the user device is on a non-work site or during non-working hours.

In embodiments where the user device is in a BYOD or COPE environment, the user device may be controlled or managed by a central device policy or management system, such as a MDM system. The central device management system may manage many user devices on the enterprise network. The management system may control or limit access to the hardware resources of the user device. The virtual containers 130, 140 may also be managed by the device management system. For example, the device management system may start, stop, switch, suspend, or resume the virtual containers 130, 140, and may execute or terminate processes or tasks in the virtual containers 130, 140.

The kernel 110 includes kernel space components, such as a hardware device driver 112 and virtual device drivers 114, 116. In some embodiments, the kernel 110 is a Unix-like kernel, such as Android or GNU/Linux. The hardware device driver 112 accesses or controls the hardware features on the user device. The hardware device driver 112 may be a loadable kernel module, or statically linked to the kernel 110. Although various embodiments are described with respect to an Android kernel, it should be appreciated that embodiment virtualization systems and methods may be implemented with a wide variety of operating system kernels. Embodiment techniques could be used on any platform with deployed kernel-level virtual containers, and are not limited to Android platforms.

The virtual device drivers 114, 116 forward driver messages between the hardware device driver 112 and the virtual containers 130, 140. Driver messages may include data, events, and status updates from the hardware device driver 112. The kernel 110 includes a virtual device driver 114, 116 for each of the virtual containers 130, 140. The virtual containers 130, 140 access the virtual device drivers 114, 116 instead of directly accessing the hardware device driver 112. The virtual containers 130, 140 access the virtual device drivers 114, 116 in the same manner that they would access the hardware device driver 112. Virtualizing the hardware device driver 112 to multiple device nodes (e.g., the virtual device drivers 114, 116) allows the virtual containers 130, 140 to share hardware resources that would ordinarily only be accessible from a single virtual container. For example, an audio device may only be accessed by a single virtual container for audio playback, but use of the virtual device drivers 114, 116 allows both of the virtual containers 130, 140 to perform audio playback simultaneously. Further, isolating device access operations for the virtual containers 130, 140 to separate device nodes may afford the kernel 110 additional opportunities for device access control and protection. In some embodiments, access to the device nodes may be controlled by the device management system.

The host container 120 includes services and functionality for interacting with the hardware device driver 112, such as a virtual device driver controller 122. The virtual device driver controller 122 forwards driver messages between the virtual device drivers 114, 116 and the hardware device driver 112. The virtual device driver controller 122 also controls and manipulates the hardware device driver 112. The virtual device driver controller 122 may restrict access to the hardware device driver 112 from the virtual containers 130, 140. As further discussed below, the virtual device driver controller 122 may filter access by some or all of the virtual containers 130, 140 to a subset of functionality of the hardware device driver 112, or may completely prevent access to the hardware device driver 112. The host container 120 may also include services for interacting with the central device management system. In some embodiments, the virtual device driver controller 122 is configured by the central device management system. Although the virtual device driver controller 122 is shown in the host container 120, it should be appreciated that the virtual device driver controller 122 is a service that could be located in another user space or in the kernel 110.

The virtual containers 130, 140 are user space containers that run on the kernel 110. The virtual containers 130, 140 share the kernel 110, but have user space isolation. As a result, processes in one of the virtual containers 130, 140 do not see other processes or resources in other virtual containers. In embodiments where the kernel 110 is a GNU/Linux kernel, the virtual containers 130, 140 may run different Linux distributions such as Ubuntu, Red Hat, Debian, and the like. In embodiments where the operating system 100 is a common kernel-based platform, the virtual containers 130, 140 may be different versions or releases of an operating system based on the same kernel, such as Android or Sailfish. In such embodiments, each version or release of the platform may run simultaneously in different ones of the virtual containers 130, 140. In embodiments where the kernel 110 is a BSD or XNU kernel, the virtual containers 130, 140 may be different jails. The virtual containers 130, 140 include hardware abstraction layers (HALs) 132, 142 and processes 134, 144.

The HALs 132, 142 provide an abstract interface to the hardware resources of the user device. The HALs 132, 142 include an application program interface (API) for applications and services to communicate with the hardware resources. The HALs 132, 142 access the hardware resources through the virtual device drivers 114, 116. By accessing hardware through the virtual device drivers 114, 116, instead of directly accessing the hardware device driver 112, additional access controls can be applied to limit the hardware resources that the virtual containers 130, 140 may access.

The processes 134, 144 execute different threads or tasks in the virtual containers 130, 140, and may perform different functions. The processes 134, 144 may be software operated by a user, or services. The processes 134, 144 access the hardware device driver 112 through the HALs 132, 142, the virtual device drivers 114, 116, and the virtual device driver controller 122. In embodiments where the hardware device driver 112 is for a GPS device, the hardware device driver 112 interacts with the GPS device to acquire location data, and then sends that data to the virtual device driver controller 122. The virtual device driver controller 122 then sends that data to each of the virtual device drivers 114, 116. The HALs 132, 142 then access the virtual device drivers 114, 116, and the processes 134, 144 receive the location data from the HALs 132, 142. In embodiments where the hardware device driver 112 is for an audio device, the virtual device driver controller 122 receives audio signals from each of the virtual containers 130, 140 and forwards the signals to the hardware device driver 112. In such embodiments, the virtual device driver controller 122 may further include a stream mixer or multiplexer to mix the audio signals from each of the virtual containers 130, 140.

By proxying driver messages through the virtual device drivers 114, 116 and the virtual device driver controller 122, the virtual containers 130, 140 can share access to the hardware device driver 112. Further, access to the hardware device driver 112 by the virtual containers 130, 140 can be centrally controlled. For example, driver messages for particular resources may be enabled, disabled, or filtered for some or all of the virtual containers 130, 140.

Figure 2:
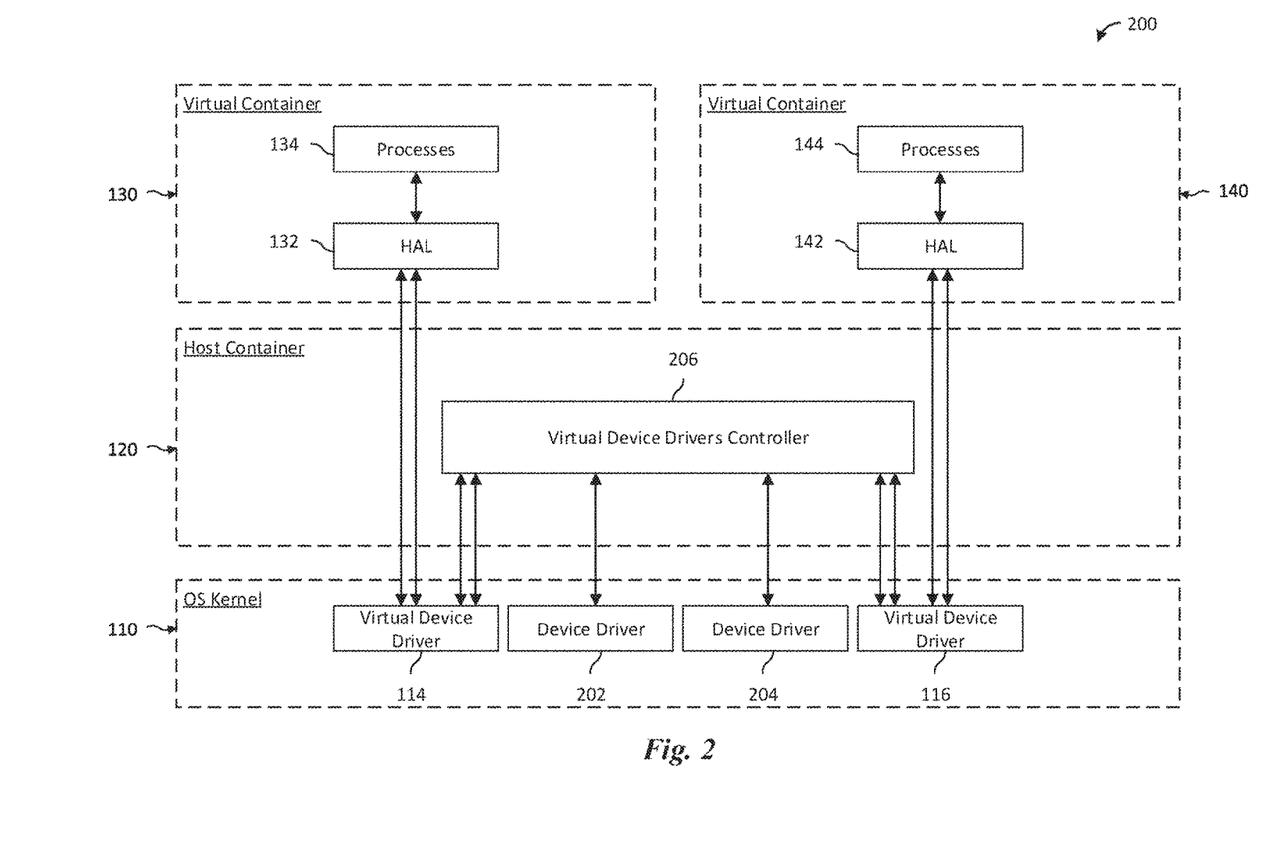
FIG. 2 is a block diagram of an operating system with virtual hardware.

FIG. 2 is a block diagram of an operating system 200 with virtual hardware. The operating system 200 is similar to the operating system 100, except that the kernel 110 includes multiple device drivers 202, 204, and the host container 120 includes a virtual device drivers controller 206 that supports multiple device drivers. Each of the device drivers 202, 204 is similar to the hardware device driver 112 (discussed above), but are for different devices. In some embodiments, the device drivers 202, 204 are for devices of the same device class, and may be in the same kernel space. For example, the device driver 202 may be for a mouse, and the device driver 204 may be for a keyboard. There could be other device drivers as well, for accessing, e.g., a touchpad, touchscreen, joystick, etc. Some or all of the hardware device drivers in a device class may be aggregated together by the virtual device drivers controller 206. In some embodiments, the device drivers 202, 204 are for devices of different device classes.

The virtual device drivers controller 206 is similar to the virtual device driver controller 122. However, instead of accessing one device driver, the virtual device drivers controller 206 aggregates and accesses both of the device drivers 202, 204. The virtual device drivers 114, 116 may access both of the device drivers 202, 204 through the virtual device drivers controller 206, and may be referred to as aggregated virtual device drivers. Continuing the above example, the virtual device drivers controller 206 accesses the mouse through the device driver 202, and accesses the keyboard through the device driver 204. The virtual device drivers controller 206 then aggregates the mouse and keyboard driver messages, and sends them to each of the virtual device drivers 114, 116. The HALs 132, 142 access the virtual device drivers 114, 116, and the processes 134, 144 receive driver messages for the input subsystem from the virtual device drivers 114, 116. The virtual device drivers controller 206 thus provides a driver controller for the input subsystem, instead of for individual devices. Combining hardware device drivers to a single virtual device driver and controller may reduce multiplicity of virtual device drivers, decreasing overhead of the system.

Figure 3:
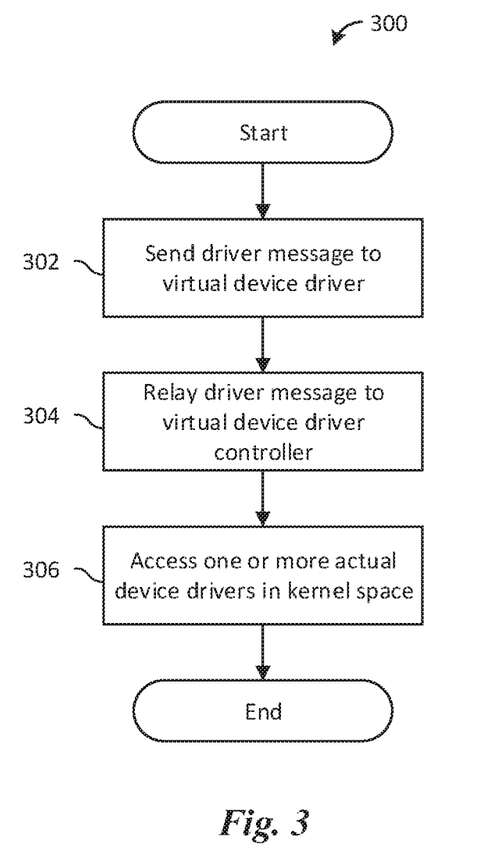
FIG. 3 is a flow diagram of a virtual hardware control method.

FIG. 3 is a flow diagram of a virtual hardware control method 300. The virtual hardware control method 300 may be indicative of operations occurring in the operating system 100 or the operating system 200.

First, a driver message is sent to the virtual device driver (step 302). The driver message is sent from a virtual container. The driver message may be sent by a HAL, which sends the driver messages to the virtual device driver in the same manner it would send the driver messages to the hardware device driver. The virtual device driver may be for a single device, or may be an aggregated virtual device driver for accessing multiple devices.

Next, the driver message is relayed to the virtual device driver controller (step 304). Specifically, the virtual device driver receives the driver message from the HAL and forwards it to the virtual device driver controller. The virtual device driver controller may be in a same or different space than the virtual device driver.

Next, the hardware device drivers are accessed in kernel space (step 306). The hardware device drivers are accessed by the virtual device driver(s) controller. The virtual device driver(s) controller may access one hardware device driver, or if it has aggregated multiple devices, may access one or more of hardware device drivers.

Figure 4:
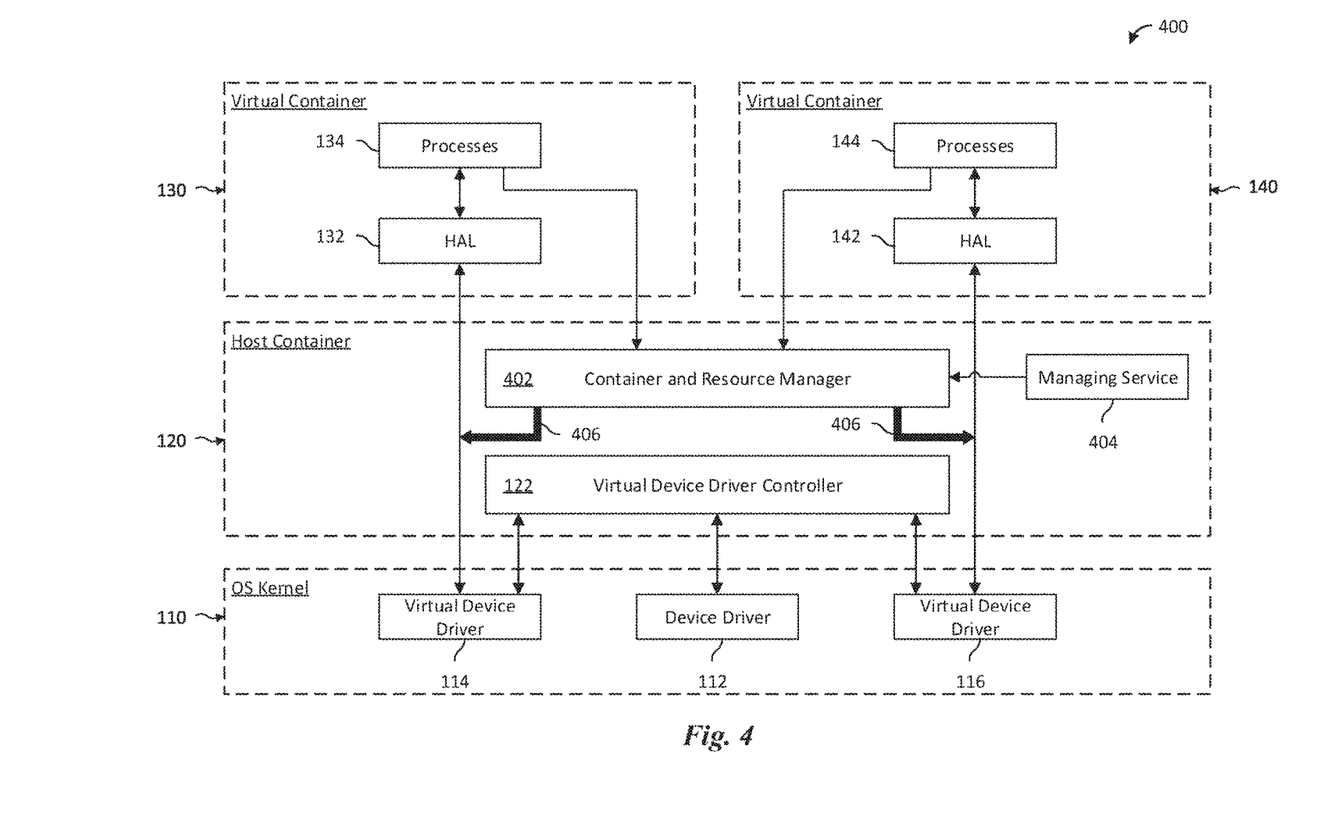
FIG. 4 is a block diagram of an operating system with virtual hardware.

FIG. 4 is a block diagram of an operating system 400 with virtual hardware. The operating system 400 is similar to the operating system 100, except that the host container 120 further includes a container and resource manager (CRM) 402, and a managing service 404. The CRM 402 manages and controls access to hardware resources by the virtual containers 130, 140, and is sometimes simply referred to as a "resource manager." For example, the CRM 402 may prevent one or more of the virtual containers 130, 140 from accessing a specific hardware resource. Alternatively, the CRM 402 may restrict one or more of the virtual containers 130, 140 from accessing a subset of functionality for the hardware resources. The CRM 402 may also perform some virtual container management functions (such as starting/stopping virtual containers), acquire/release hardware resources, and report statuses of hardware resources.

The CRM 402 is a service in the host container 120 that the processes 134, 144 in the virtual containers 130, 140 may access. The managing service 404 may also access the CRM 402. In some embodiments, the managing service 404 is an MDM service. Processes and services perform management actions with the CRM 402, such as disabling or limiting access to certain hardware resources. The CRM 402 may communicate with the processes 134, 144 and/or the managing service 404 using a variety of mechanisms. Communication mechanisms include inter-process communication mechanisms, such as an Android Binder, a Unix socket, or a TCP/IP socket; sharing mechanisms such as a bind mount or shared memory; and the like. Different virtual containers may have access to different management features on the CRM 402. For example, the virtual containers 130, 140 may be able to access fewer management features than the managing service 404. Limiting exposure of management features to the virtual containers 130, 140 may reduce the attack surface of the operating system 100.

In the embodiment shown in FIG. 4, the CRM 402 controls access to hardware resources by directly controlling 406 the interfaces between the virtual device drivers 114, 116 and the virtual containers 130, 140. For example, the CRM 402 may receive a command from the managing service 404 to disable the keyboard for virtual container 130. The CRM 402 disables the keyboard by hiding or disconnecting the virtual device driver 114 from the virtual container 130. Such direct control may cause system instability in the virtual container 130. For example, the HAL 132 in the virtual container 130 may attempt to continue accessing the virtual device driver 114 after it is hidden or disconnected. Such instability is localized to the virtual container 130, and does not affect stability or processing in other virtual containers.

Figure 5:
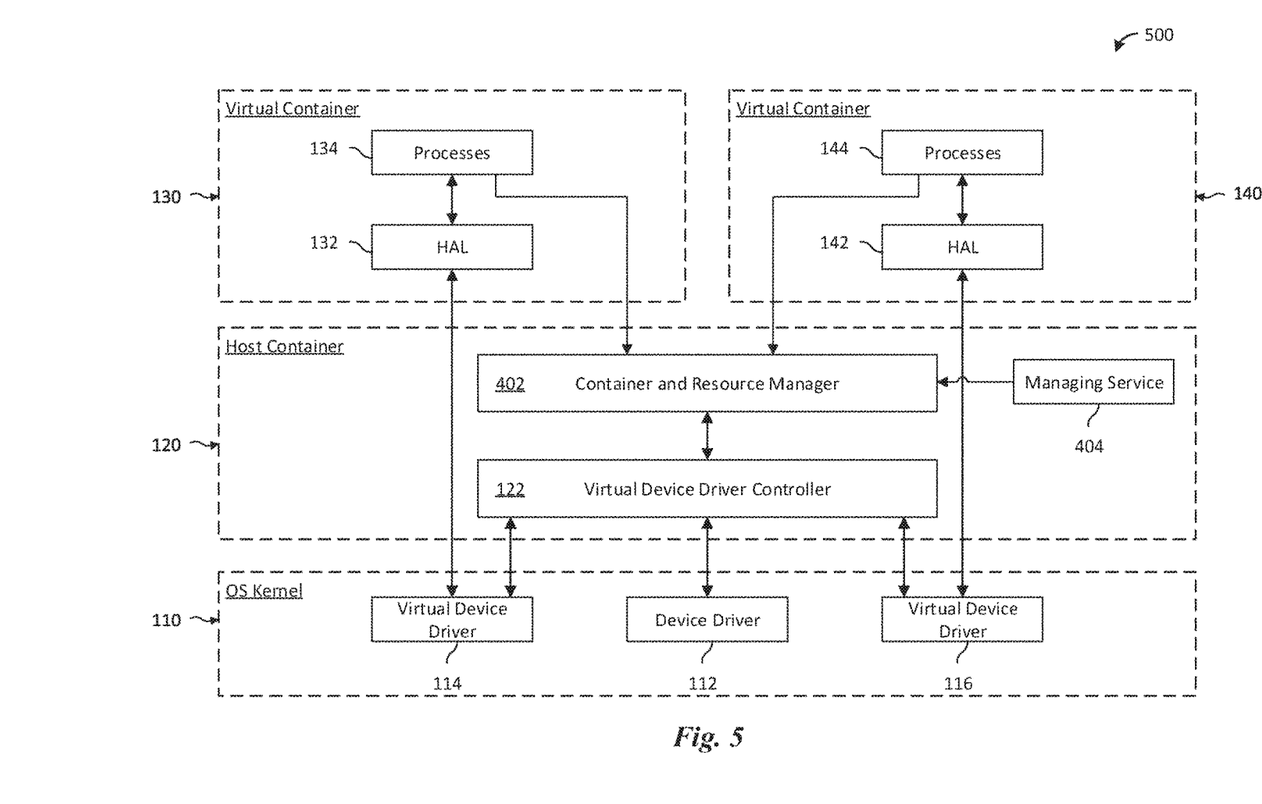
FIG. 5 is a block diagram of an operating system with virtual hardware.

FIG. 5 is a block diagram of an operating system 500 with virtual hardware. The operating system 500 is similar to the operating system 400, except that the CRM 402 controls access to hardware resources by interacting with the virtual device driver controller 122 instead of controlling 406 the interfaces for the virtual device drivers 114, 116. The CRM 402 configures the virtual device driver controller 122 to monitor requests/events to/from the hardware device driver 112. The CRM 402 filters prohibited requests/events, and passes through permitted requests/events, based on the configuration from the CRM 402. Filtering requests/events allows the CRM 402 to achieve more granular access control. For example, the CRM 402 may receive a command from the managing service 404 to disable a mouse button for the virtual container 130. The CRM 402 configures the virtual device driver controller 122 to filter mouse button click events and not pass them to the virtual device driver 114. The mouse remains enabled for both of the virtual containers 130, 140, but the mouse button is disabled for the virtual container 130. In embodiments where the user device is a mobile or tablet device, the CRM 402 may receive a command to disable the touch screen on the device.

Figure 6:
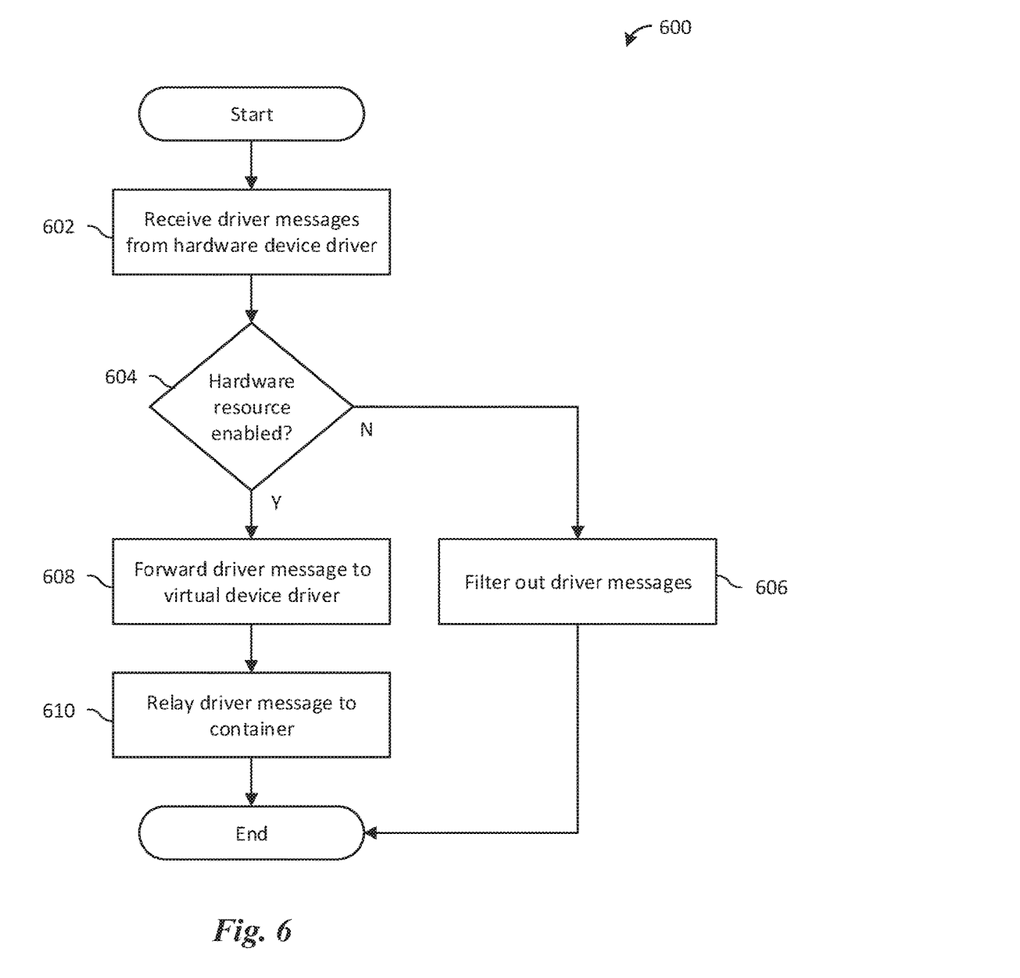
FIG. 6 is a flow diagram of a virtual hardware control method.

FIG. 6 is a flow diagram of a virtual hardware control method 600. The virtual hardware control method 600 may be indicative of operations occurring in the operating system 500.

First, the virtual device driver controller receives driver messages from a hardware device driver (step 602). The driver messages may be data from the hardware resources, such as GPS location information. The virtual device driver may be for a single device, or may be an aggregated virtual device driver for accessing multiple devices.

If the hardware resource is enabled for a virtual container (step 604), the driver messages for the hardware resource are forwarded to the virtual device driver for the virtual container (step 606). The driver messages are forwarded by the virtual device driver to the virtual container. The hardware resource may be disabled by the virtual device driver controller if, e.g., the CRM has requested that the virtual device driver controller disable the hardware resources for the virtual container.

If the hardware resource is disabled for the virtual container (step 604), the message is not forwarded to the virtual device driver (step 610). For example, the message can be filtered by identifying the message type and the destination virtual container, and dropping the message if the message type is disabled for the destination virtual container. As noted above, the CRM may enable and disable certain functionality for a hardware resource. Thus, only some driver messages may be filtered for a hardware resource, and others are passed on to the virtual device driver and virtual container.

Figure 7:
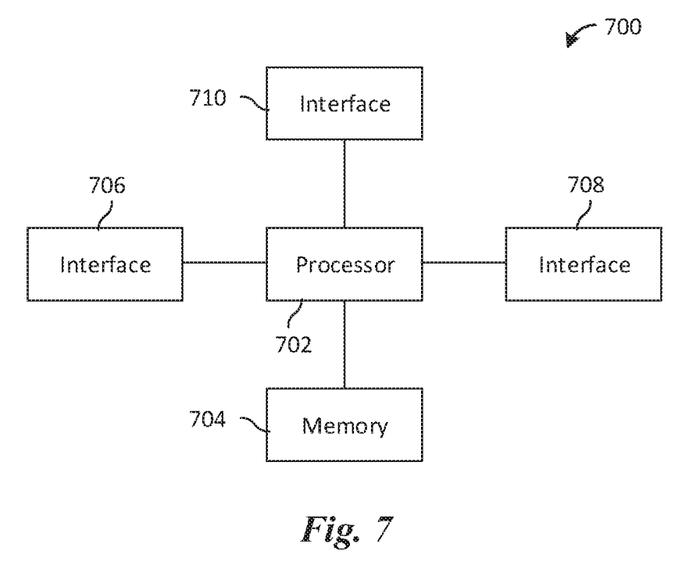
FIG. 7 is a diagram of a processing system.

FIG. 7 is a diagram of a processing system 700. The processing system 700 may be used for performing methods described herein, which may be installed in a host device. As shown, the processing system 700 includes a processor 702, a memory 704, and interfaces 706-710, which may (or may not) be arranged as shown in FIG. 7. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control, or management messages from the processor 702 to applications installed on the host device and/or a remote device. As another example, one or more of the interfaces 706, 708, 710 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an accessing unit/module, a sending unit/module, a configuring unit/module, a receiving unit/module, a multiplexing unit/module, a preventing unit/module, a disabling unit/module, a filtering unit/module, a forwarding unit/module, and/or a transmitting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

receiving, by a virtual device driver controller (VDDC) of an operating system running on a user computing device, a first driver message from a first hardware device driver configured to access or control a first hardware resource of the user computing device, the first hardware device driver being located in a kernel of the operating system, the kernel being shared by a plurality of virtual containers generated by the operating system using operating system virtualization, the VDDC communicating directly with the first hardware device driver;

sending, by the VDDC, the first driver message to a first virtual device driver associated with a first virtual container of the plurality of virtual containers if the VDDC is configured to enable the first virtual container to access the first hardware resource, the first virtual device driver located in the kernel and configured to control access to the first hardware device driver by the first virtual container; and forwarding, by the first virtual device driver, the first driver message to the first virtual container of the plurality of virtual containers.

2. The method of claim 1, further comprising:

sending, by the VDDC, the first driver message to a second virtual device driver, the second virtual device driver located in the kernel; and forwarding, by the second virtual device driver, the first driver message to a second virtual container of the plurality of virtual containers, the second virtual container being different than the kernel and the first virtual container.

3. The method of claim 2, wherein the first hardware device driver is for a global positioning system (GPS) device.

4. The method of claim 1, further comprising:

receiving, by the first virtual container, the first driver message from the first virtual device driver, the first virtual device driver supporting a subset of a functionality of the first hardware device driver.

5. The method of claim 4, further comprising configuring, by the VDDC, the first hardware device driver, the first virtual container being prevented by the VDDC from configuring the first hardware device driver.

6. The method of claim 1, wherein the first virtual device driver is an aggregated device driver for a device class, and wherein the first hardware resource is a plurality of hardware resources for the device class.

7. The method of claim 6, wherein the first hardware device driver includes one of a mouse driver and a keyboard driver.

8. The method of claim 1, further comprising:
receiving, by the VDDC, a second driver message for the first hardware device driver from the first virtual container, and a third driver message for the first hardware device driver from a second virtual container of the plurality of virtual containers;
multiplexing, by the VDDC, the second driver message and the third driver message; and
sending, by the VDDC, the multiplexed second driver message and the third driver message to the first hardware device driver to enable the first virtual container and the second virtual container to access the first hardware resource.

9. The method of claim 8, wherein the first hardware device driver is an audio device driver.

10. A method comprising:
receiving, by a container and resource manager (CRM) of an operating system running on a user computing device, a request to prevent a first virtual container of a plurality of virtual containers of the operating system from accessing a hardware resource the user computing device, the hardware resource being shared by the plurality of virtual containers;
receiving, by a virtual device driver controller (VDDC) of the operating system, driver messages from a hardware device driver configured to access or control the hardware resource, the hardware device driver located in a kernel of the operating system, the VDDC communicating directly with the hardware device driver;
preventing, by the CRM, transmission of at least one of the driver messages to the first virtual container; and
sending, by the VDDC, the at least one of the driver messages to a second virtual container of the plurality of virtual containers that is different than the first virtual container.

11. The method of claim 10, further comprising:
transmitting, by the VDDC, the driver messages to a first virtual device driver for the first virtual container, the first virtual device driver being located in the kernel, wherein preventing transmission of the at least one of the driver messages to the first virtual container comprises disabling, by the CRM, an interface between the first virtual device driver and the first virtual container.

12. The method of claim 10, wherein the request received by the CRM is a request to prevent the first virtual container from accessing a subset of functionality of the hardware resource, and wherein preventing transmission of the at least one of the driver messages to the first virtual container comprises:
filtering, by the VDDC, the at least one of the driver messages associated with the subset of functionality of the hardware resource; and
sending, by the VDDC, the unfiltered driver messages to the first virtual container.

13. The method of claim 12, further comprising:
forwarding, by the CRM, the request to the VDDC.

14. The method of claim 10, wherein sending the at least one of the driver messages to the second virtual container comprises:
transmitting, by the VDDC, the at least one of the driver messages to a second virtual device driver for the second virtual container, wherein the second virtual device driver is located in the kernel; and
forwarding, by the second virtual device driver, the at least one of the driver messages to the second virtual container.

15. The method of claim 10, wherein receiving the request comprises:
receiving, by the CRM, the request from a service in one of the plurality of containers of the operating system.

16. The method of claim 15, wherein the service is a device management service.

17. The method of claim 15, wherein the service is in the same virtual container as the CRM.

18. The method of claim 17, wherein the plurality of virtual containers comprises a host virtual container and the service and the CRM are in the host virtual container.

19. The method of claim 15, wherein the service is in one of the first virtual container or the second virtual container.

20. The method of claim 10, wherein the hardware resource is a device class, and wherein the at least one of the driver messages are from a plurality of hardware device drivers for the device class.

21. A user computing device comprising:
a processor; and
a non-transitory computer readable storage medium storing programming for execution by the processor, the programming including instructions to:
receive, by a virtual device driver controller (VDDC) of an operating system executed by the processor of the user computing device, a first driver message from at least one hardware device driver configured to access or control at least one hardware resource on the user device, the at least one hardware resource being shared by a plurality of virtual containers of the operating system, the at least one hardware device driver located in a kernel of the operating system, the VDDC communicating directly with the at least one hardware device driver;
send, by the VDDC, the first driver message to a first virtual device driver, the first virtual device driver located in the kernel; and
forward, by the first virtual device driver, the first driver message to a first virtual container of the plurality of virtual containers.

22. A user device comprising:
a processor; and
a non-transitory computer readable storage medium storing programming for execution by the processor, the programming including instructions to:
receive, by a container and resource manager (CRM), a request to prevent a first virtual container of plurality of virtual containers of an operating system executed by the processor of the user device from accessing a hardware resource on the user device, the hardware resource being shared by the plurality of virtual containers;
receive, by a virtual device driver controller (VDDC), driver messages from a hardware device driver configured to access or control the hardware resource, the hardware device driver located in a kernel of the operating system, the VDDC communicating directly with the hardware device driver;

prevent, by the CRM, transmission of at least one of the driver messages to the first virtual container; and send, by the VDDC, the at least one of the driver messages to a second virtual container of the plurality of virtual containers that is different than the first virtual container.

* * * * *